United States Patent
Herszfang et al.

(10) Patent No.: US 12,353,311 B2
(45) Date of Patent: Jul. 8, 2025

(54) DYNAMIC APPLICATIVE SESSION GROUPING

(71) Applicant: Zscaler, Inc., San Jose, CA (US)

(72) Inventors: Hila Paz Herszfang, Rishon Letsion (IL); Eden Meyuhas, Holon (IL)

(73) Assignee: Zscaler, Inc., San Jose, CA (US)

( * ) Notice: Subject to any disclaimer, the term of this patent is extended or adjusted under 35 U.S.C. 154(b) by 2 days.

(21) Appl. No.: 17/869,328

(22) Filed: Jul. 20, 2022

(65) Prior Publication Data

US 2024/0028494 A1 Jan. 25, 2024

(51) Int. Cl.
*G06F 11/30* (2006.01)
*G06N 20/00* (2019.01)

(52) U.S. Cl.
CPC ...... *G06F 11/3075* (2013.01); *G06F 11/3079* (2013.01); *G06N 20/00* (2019.01)

(58) Field of Classification Search
CPC .. G06F 11/3075; G06F 11/3079; G06F 16/34; G06F 16/258; G06F 16/86; G06F 16/211; G06F 16/215; G06F 16/254; G06F 16/27; G06F 40/103; G06F 40/151; G06F 2221/0775; G06F 16/2358; G06F 16/24575; G06F 16/9566; G06F 18/00; G06F 16/955; G06F 21/554; G06F 21/552; G06F 21/55; G06N 20/00; G06N 7/01; G06N 3/08; G06N 3/02; G06N 3/047; H04L 63/20; H04L 2463/102; H04L 63/1416; H04L 63/1441; H04L 43/08; H04L 43/00; H04L 43/062; H04L 63/1408; H04L 43/045; H04L 63/1425; H04L 63/1433; H04L 65/1069; H04L 47/20; H04L 67/145; H04L 65/1101; H04L 67/141; H04L 67/142; H04L 41/069; H04L 43/0876; H04L 43/10; H04L 63/145; H04L 63/0236; H04L 63/1483; H04L 41/147; H04L 63/0227
USPC ....................................................... 707/754
See application file for complete search history.

(56) References Cited

U.S. PATENT DOCUMENTS

| | | | |
|---|---|---|---|
| 11,438,377 B1* | 9/2022 | Azarafrooz | G06N 3/08 |
| 2010/0046377 A1* | 2/2010 | Ryan | H04L 41/0681 |
| | | | 370/241 |
| 2010/0250726 A1 | 9/2010 | Moses et al. | |
| 2014/0115688 A1* | 4/2014 | Zuk | H04L 63/1441 |
| | | | 726/13 |
| 2015/0200956 A1* | 7/2015 | Koide | H04L 63/1408 |
| | | | 726/22 |
| 2016/0062816 A1* | 3/2016 | Ivanova | H04L 41/507 |
| | | | 714/57 |
| 2016/0330236 A1* | 11/2016 | Reddy | H04L 63/1416 |

(Continued)

*Primary Examiner* — Evan Aspinwall
(74) *Attorney, Agent, or Firm* — Baratta Law PLLC; Lawrence A. Baratta, Jr.; Ryan Odessa

(57) ABSTRACT

Systems and methods for dynamic applicative session separation and grouping. The system receives logs from one of a plurality of machines. The system can receive and manage logs from any number of machines in the cloud-based system. The system resamples the received logs by a given time frame. The system determines time intervals between activities based on the resampling of the logs. After determining the time intervals, the system determines a probability of a new log to be received after a time interval. The system then defines a session separation breaker and defines one or more logs as opening or closing a session.

20 Claims, 8 Drawing Sheets

(56) References Cited

U.S. PATENT DOCUMENTS

| | | | | |
|---|---|---|---|---|
| 2017/0031742 A1* | 2/2017 | Jilani | G06F 11/079 |
| 2017/0063888 A1* | 3/2017 | Muddu | G06V 10/225 |
| 2017/0126714 A1* | 5/2017 | Nooka | H04L 63/1425 |
| 2017/0187580 A1* | 6/2017 | Curcic | H04L 67/10 |
| 2017/0206238 A1* | 7/2017 | Coutinho | G06F 16/215 |
| 2017/0244730 A1* | 8/2017 | Sancheti | H04L 63/205 |
| 2017/0264626 A1* | 9/2017 | Xu | H04L 63/1425 |
| 2017/0264640 A1* | 9/2017 | Narayanaswamy | G06F 16/285 |
| 2017/0353477 A1* | 12/2017 | Faigon | G06F 21/554 |
| 2018/0018456 A1* | 1/2018 | Chen | G06F 21/552 |
| 2018/0096260 A1* | 4/2018 | Zimmer | G06N 5/025 |
| 2018/0267947 A1* | 9/2018 | Miller | G06F 16/2477 |
| 2019/0260781 A1* | 8/2019 | Fellows | H04L 41/22 |
| 2020/0051419 A1* | 2/2020 | Malaver | H04L 67/10 |
| 2020/0106786 A1* | 4/2020 | Thayer | H04L 63/1416 |
| 2020/0127973 A1* | 4/2020 | Akyol | G05B 9/02 |
| 2020/0159637 A1* | 5/2020 | Li | G06N 7/01 |
| 2020/0159841 A1* | 5/2020 | Tabares | G06F 16/1805 |
| 2020/0213338 A1* | 7/2020 | Lotem | G06N 20/00 |
| 2020/0295986 A1* | 9/2020 | Rathinasabapathy | G06F 11/1471 |
| 2021/0004726 A1* | 1/2021 | Shang | G06F 18/24 |
| 2021/0026722 A1* | 1/2021 | Bhatia | G06F 11/079 |
| 2021/0133346 A1* | 5/2021 | Alsharif | G06F 16/906 |
| 2021/0224478 A1* | 7/2021 | Gordon | G06F 40/279 |
| 2021/0365774 A1* | 11/2021 | Muhammad | G06N 3/08 |
| 2021/0409449 A1* | 12/2021 | Crabtree | H04L 63/1441 |
| 2022/0058107 A1* | 2/2022 | Hahn | G06F 11/324 |
| 2023/0325280 A1* | 10/2023 | Harsoor | G06F 11/1415 714/15 |

* cited by examiner

DYNAMIC APPLICATIVE SESSION GROUPING

FIELD OF THE DISCLOSURE

The present disclosure generally relates to computer networking systems and methods. More particularly, the present disclosure relates to systems and methods for dynamic applicative session grouping.

BACKGROUND OF THE DISCLOSURE

Analyzing user and machine cloud activity logs is crucial for any enterprise to detect suspicious internal behavior. While analyzing every single activity is somewhat useful, adding context to an activity provides a deeper investigation. Grouping the documented logs to applicative sessions is traditionally performed by either constant timeframes, session ID's, or number of logs. Such approaches, however, fail to capture similar applicative session groups that vary slightly by timing or by the number of actions. These variations are typical in cloud environments with complex architecture and connections.

Machine Learning (ML) techniques are proliferating and offer many use cases. In network and computer security, there are various use cases for machine learning, such as malware detection, identifying malicious files for further processing such as in a sandbox, user risk determination, content classification, intrusion detection, phishing detection, suspicious behavior, etc. The general process includes training where a machine learning model is trained on a dataset, e.g., data including malicious and benign content or files, and, once trained, the machine learning model is used in production to classify unknown content based on the training. One prevalent approach is to avoid using knowledge features but leverage non-knowledge features such as using n-gram of executable files, using image structure after converting executable files into images, etc. This approach theoretically can produce a good result. However, this approach requires a large training dataset and a long training cycle, leading to a high cost. The high cost is associated with training, optimizing, and updating the machine learning model. This leads to challenges to deliver trained machine learning models for production. A long training time either requires a very long optimization process for good results or a relatively short optimization process for suboptimal results. In fact, the conventional approach can require training times in days, which means updating the machine learning model takes a significant amount of time and effort, resulting in a low agility.

Also, the traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

The services disclosed herein can be combined with machine learning both in training and production. Specifically, training requires a large data set with labels for training a machine learning model. One advantage of the cloud service is its access to a large data set which can be monitored, labeled, and used for training machine learning models. Once a model is trained, it can be used in production, e.g., for identifying malware, detecting improper activity, and the like.

BRIEF SUMMARY OF THE DISCLOSURE

In an embodiment, a non-transitory computer-readable medium includes instructions that, when executed, cause a processor to: receive logs from one of a plurality of machines operating in a cloud-based system; resample the received logs by a time frame; define a session separation breaker based on a probability of a new log to be received after a time interval; and define one or more logs as opening or closing a session. The resampling is based on machine activity, where each machine is resampled based on how often activity is monitored. The probability determined for a new log to be received is a cumulative sum probability based on observed activity and time intervals. Breaks in machine activity are monitored, and the monitored breaks are considered as candidates for an applicative session separation. A local maximum of a gradient change is defined as a session separation breaker. A new applicative session is defined each time the machine rests, if the time passed before the next log is larger than a first local maximum. A log is defined as opening or closing a session based on a probability threshold, and wherein the threshold is calculated dynamically. A machine learning model is trained with historical and current logs to perform the defining of one or more logs as opening or closing a session.

In another embodiment, a method includes steps of: receiving logs from one of a plurality of machines operating in a cloud-based system; resampling the received logs by a time frame; defining a session separation breaker based on a probability of a new log to be received after a time interval; and defining one or more logs as opening or closing a session. The resampling is based on machine activity, where each machine is resampled based on how often activity is monitored. The probability determined for a new log to be received is a cumulative sum probability based on observed activity and time intervals. Breaks in machine activity are monitored, and the monitored breaks are considered as candidates for an applicative session separation. A local maximum of a gradient change is defined as a session separation breaker. A new applicative session is defined each time the machine rests, if the time passed before the next log is larger than a first local maximum. A log is defined as opening or closing a session based on a probability threshold, and wherein the threshold is calculated dynamically. A machine learning model is trained with historical and current logs to perform the defining of one or more logs as opening or closing a session.

In a further embodiment, a cloud-based system for providing dynamic session separation includes: one or more processors; and memory storing instructions that, when executed, cause the processor to: receive logs from one of a plurality of machines operating in a cloud-based system; resample the received logs by a time frame; define a session separation breaker based on a probability of a new log to be received after a time interval; and define one or more logs as opening or closing a session. The resampling is based on machine activity, where each machine is resampled based on how often activity is monitored. The probability determined for a new log to be received is a cumulative sum probability based on observed activity and time intervals. Breaks in machine activity are monitored, and the monitored breaks are considered as candidates for an applicative session separation. A local maximum of a gradient change is defined as a session separation breaker. A new applicative session is defined each time the machine rests, if the time passed before the next log is larger than a first local maximum. A log is defined as opening or closing a session based on a probability threshold, and wherein the threshold is calculated dynamically. A machine learning model is trained with historical and current logs to perform the defining of one or more logs as opening or closing a session.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

The present disclosure relates to systems and methods for dynamic applicative session separation and grouping. The system receives logs from one of a plurality of machines. The system can receive and manage logs from any number of machines in the cloud-based system. The system resamples the received logs by a given time frame. The system determines time intervals between activities based on the resampling of the logs. After determining the time intervals, the system determines a probability of a new log to be received after a time interval. The system then defines a session separation breaker and defines one or more logs as opening or closing a session.

Example Cloud-Based System Architecture

Figure 1A:
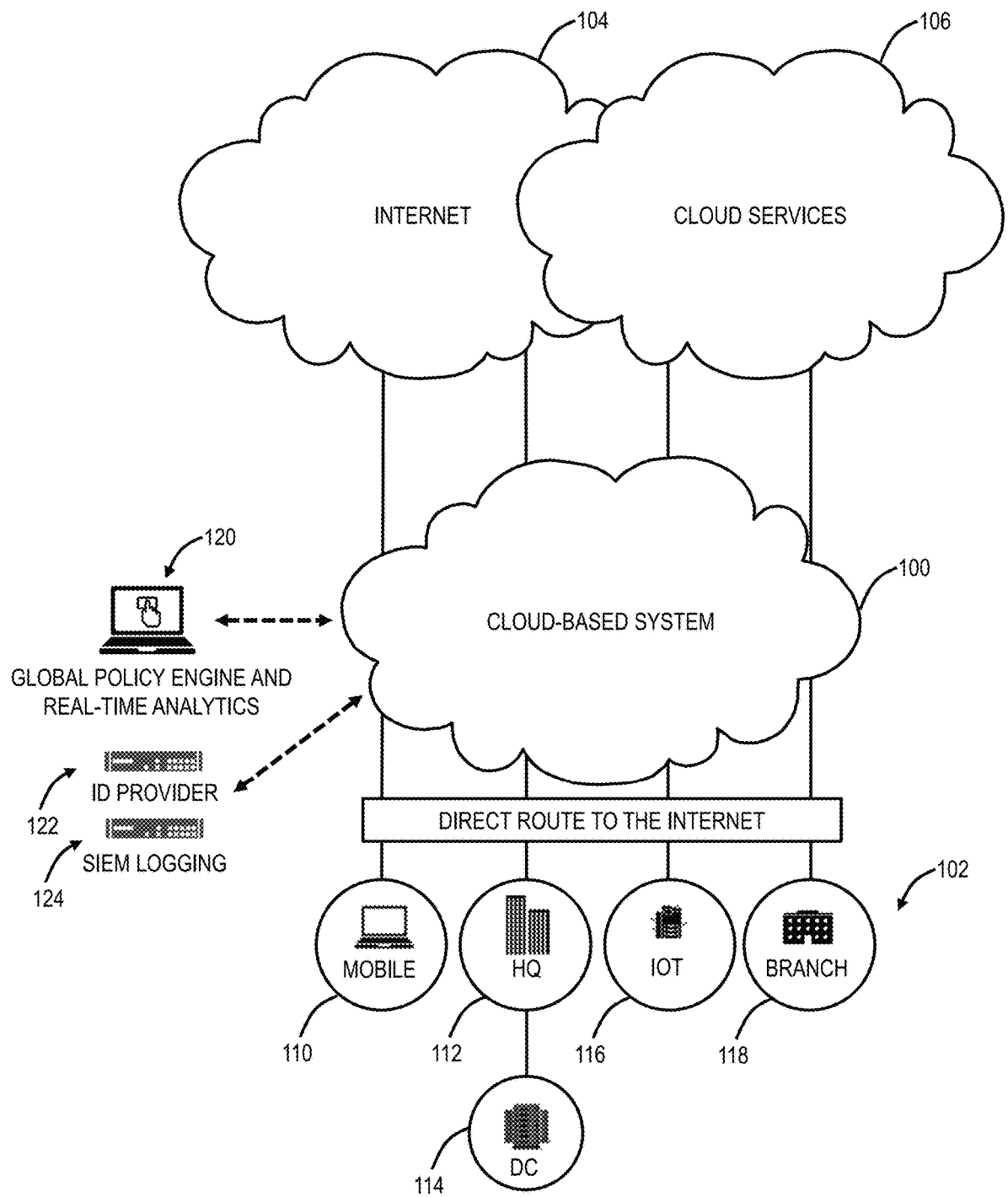
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
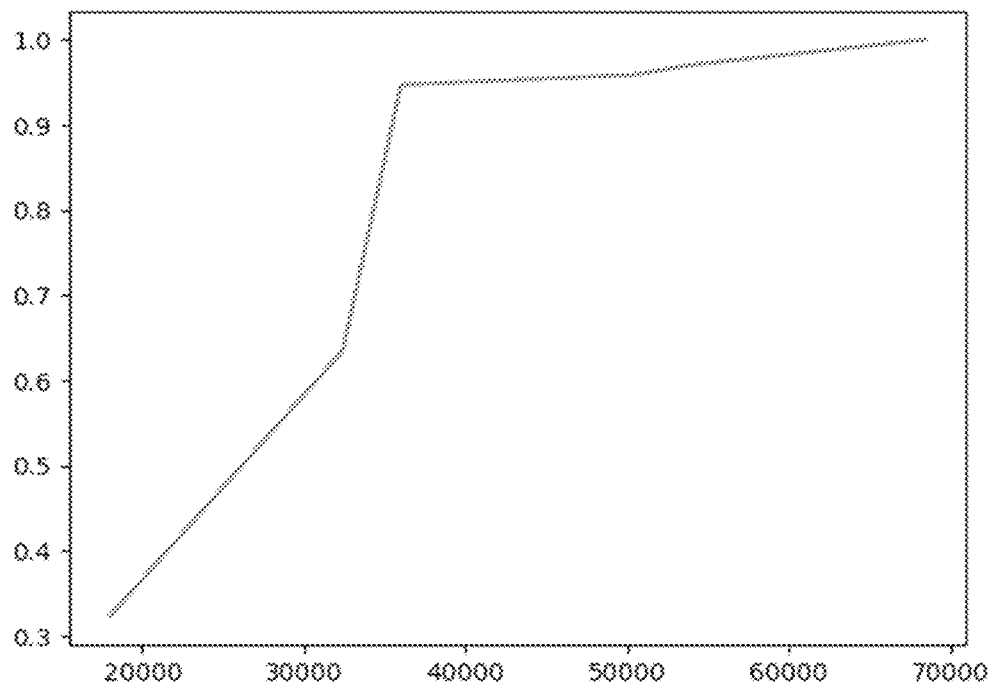
FIG. 5 is an illustrative graph of the cumulative sum probability of the present example.

For illustration purposes, the users 102 of the cloud-based system 100 can include a mobile device 110, a headquarters (HQ) 112 which can include or connect to a data center (DC) 114, Internet of Things (IOT) devices 116, a branch office/ remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
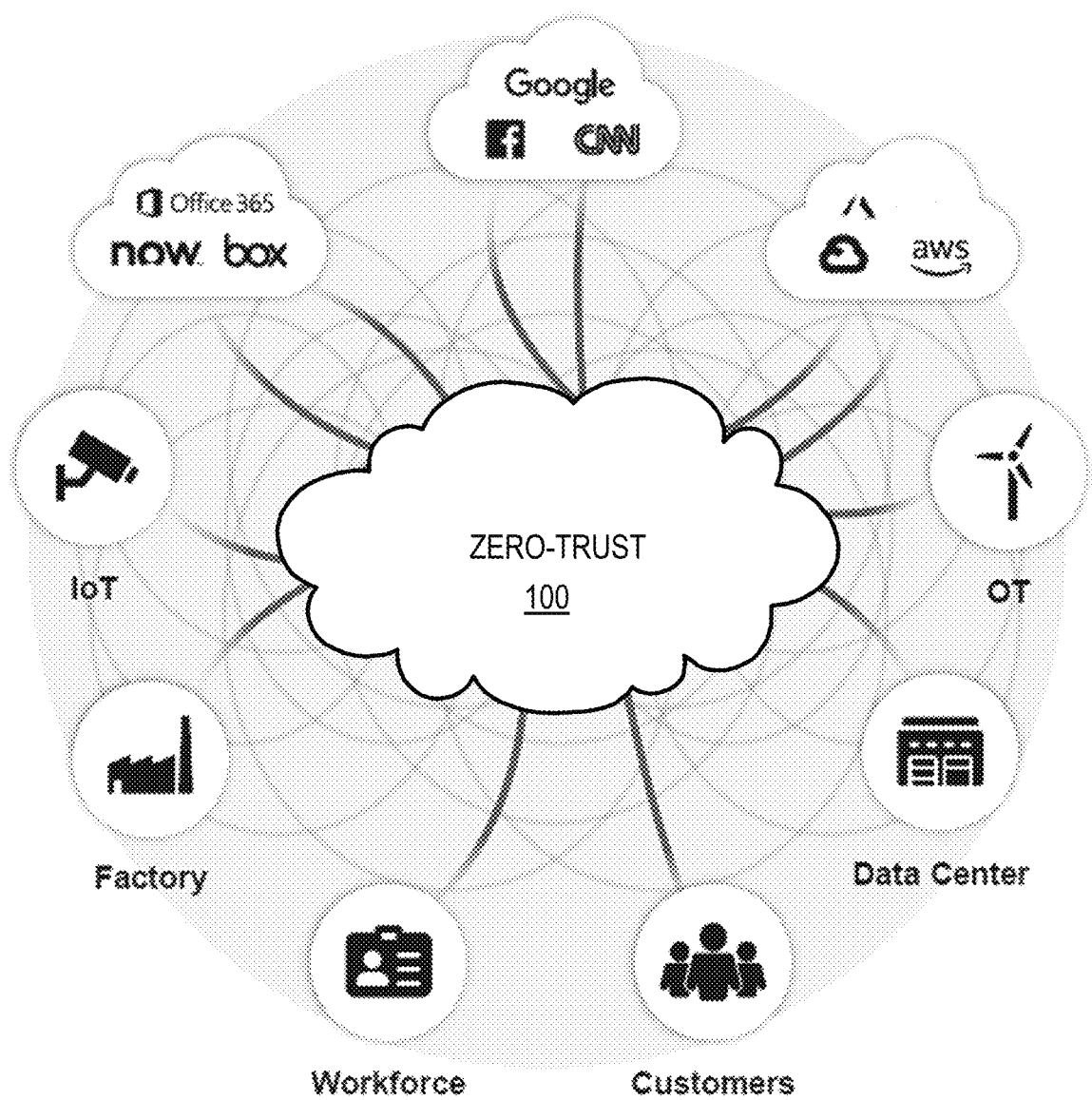
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
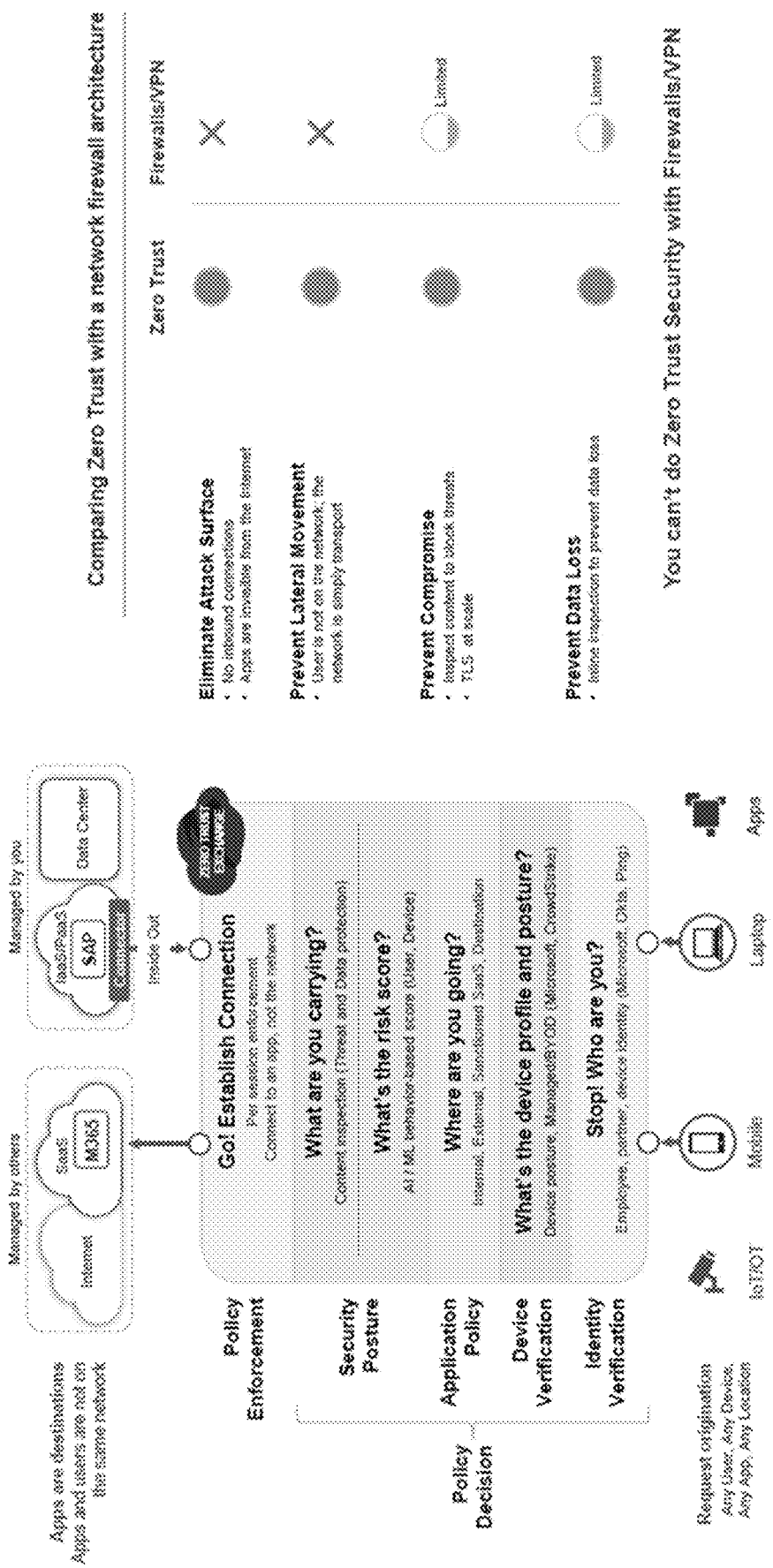
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
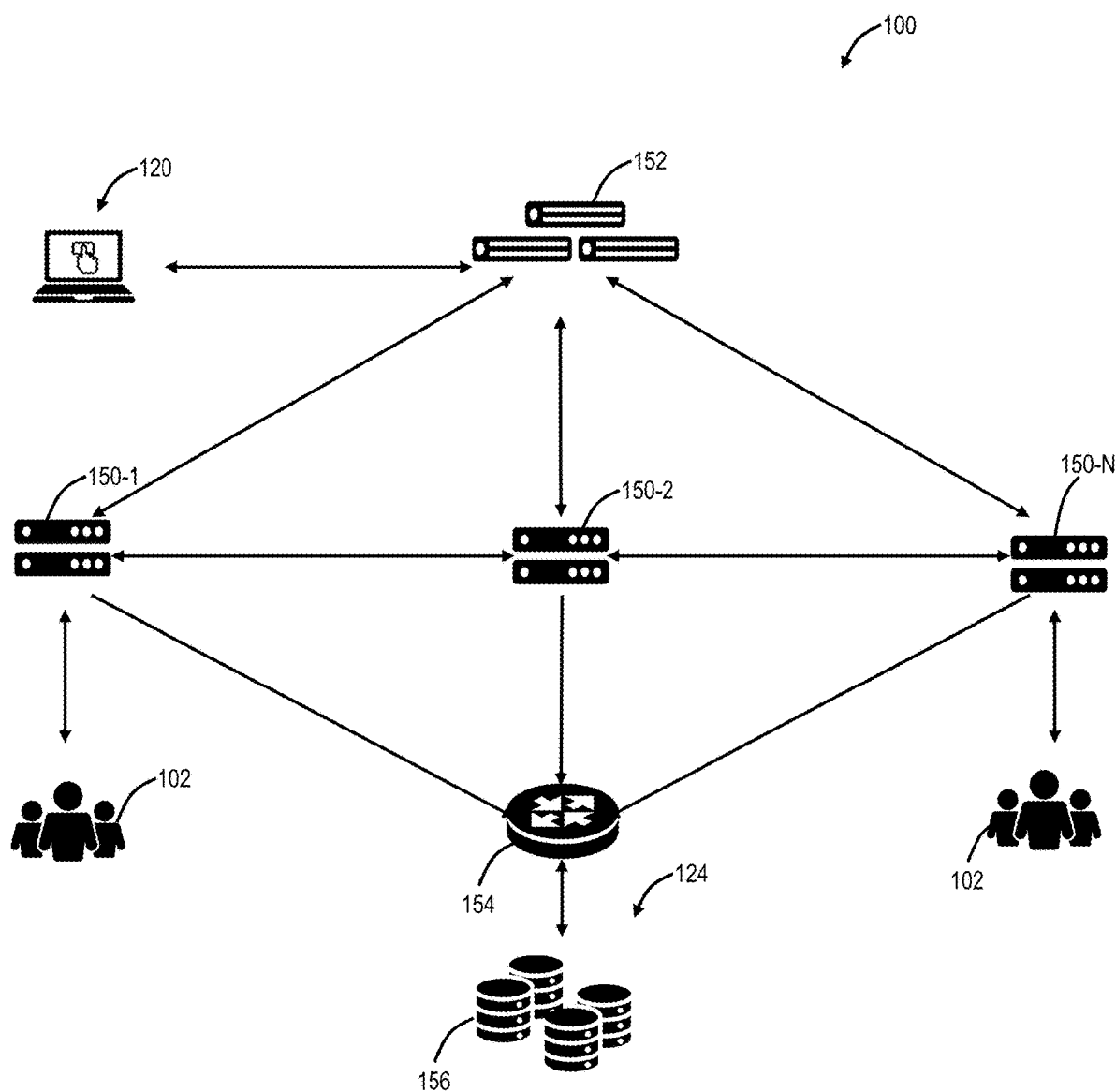
FIG. 2 is a network diagram of an example implementation of the cloud-based system.
Figure 4:
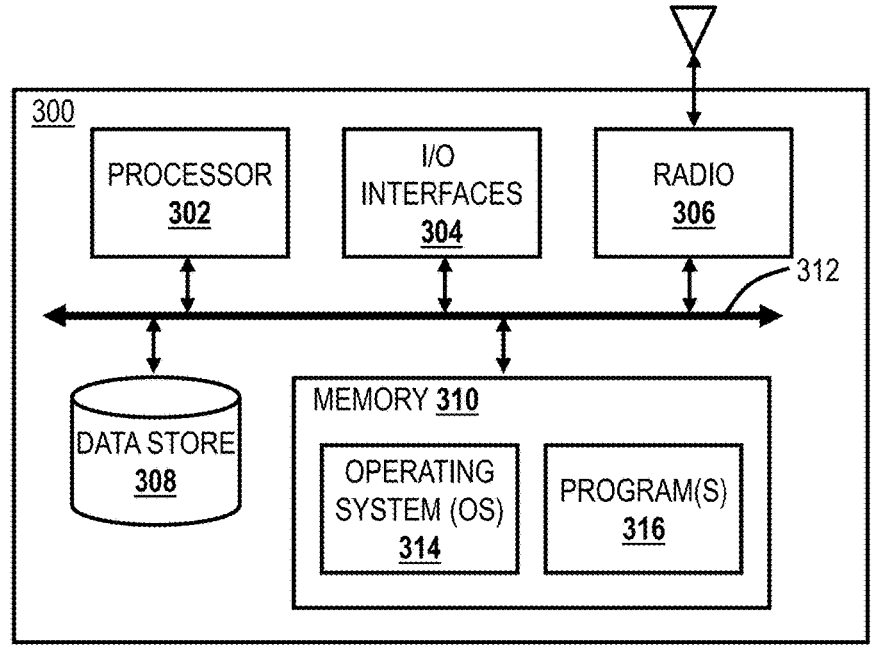

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, ..., cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
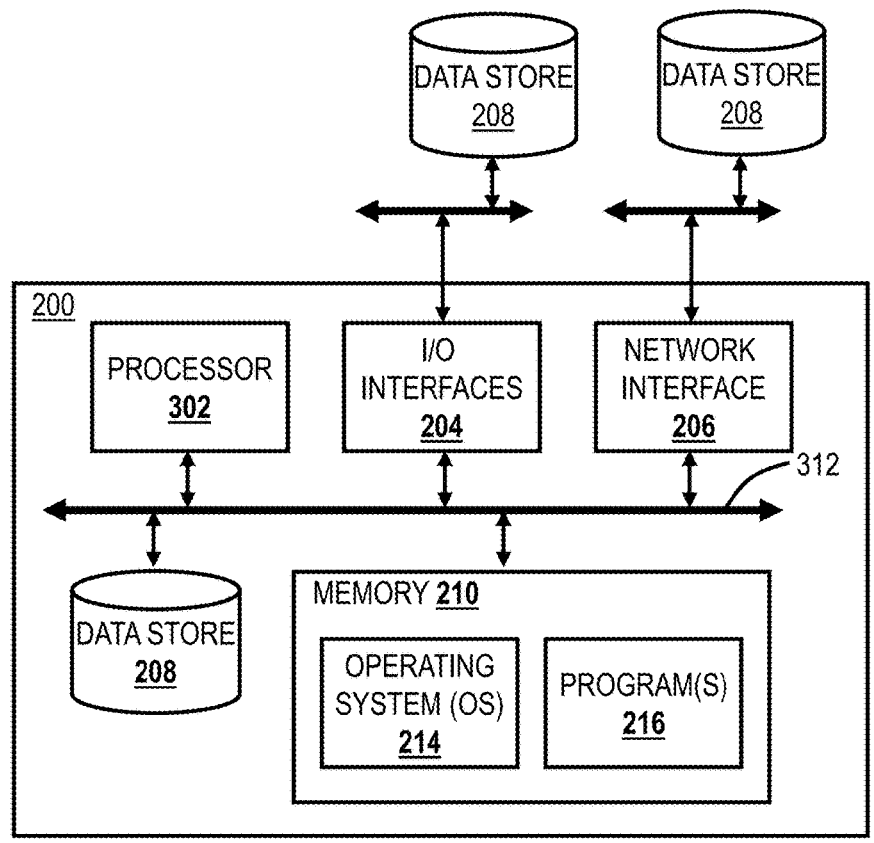
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Dynamic Applicative Session Grouping

Analyzing user and machine cloud activity logs is crucial for any organization to detect suspicious internal behavior. While analyzing every single activity is somewhat useful, adding context to an activity allows deeper investigation. As an example, a machine (M1) may perform a sequence of repeating actions several times in a day, or other time interval. A machine M1 as described in the present disclosure can include any device, server, virtual machine, etc. operating in the cloud-based system. These actions may be performed on different resources, an example is shown below.

| Action | Resource |
|---|---|
| ListDB | Resource-1 |
| CopyDBTable | Resource-2 |
| DeleteTable | Resource-2 |

The date and time on which a machine action is performed can be logged and linked with the action. A sample of such machine logs is shown below.

| Action | Resource | Time |
|---|---|---|
| ListDB | Resource-1 | Jun. 23, 2022 10:55:16 |
| ListDB | Resource-1 | Jun. 23, 2022 10:55:32 |
| CopyDBTable | Resource-2 | Jun. 23, 2022 10:56:16 |
| DeleteTable | Resource-2 | Jun. 23, 2022 10:56:56 |
| ListDB | Resource-1 | Jun. 23, 2022 11:25:00 |
| CopyDBTable | Resource-2 | Jun. 23, 2022 11:25:31 |
| DeleteTable | Resource-2 | Jun. 23, 2022 11:26:11 |
| ListDB | Resource-1 | Jun. 23, 2022 11:27:04 |
| ListDB | Resource-1 | Jun. 23, 2022 11:27:04 |
| ListDB | Resource-1 | Jun. 23, 2022 11:27:20 |
| ListDB | Resource-1 | Jun. 23, 2022 11:27:36 |
| ListDB | Resource-1 | Jun. 23, 2022 11:27:52 |
| ListDB | Resource-1 | Jun. 23, 2022 11:28:06 |
| CopyDBTable | Resource-2 | Jun. 23, 2022 11:29:20 |
| DeleteTable | Resource-2 | Jun. 23, 2022 11:30:01 |

In the example shown above, the machine M1 performs similar applicative sessions. The present disclosure provides systems and methods to group logs that relate to the same applicative session together.

Traditionally, grouping documented logs, such as the logs shown above, into applicative sessions is done by one of constant timeframes, session ID's, and number of logs. Approaches such as these fail to capture similar applicative session groups that vary slightly by timing or by the number of actions. Variations like these are common in cloud environments with complex architectures and connections. Grouping documented logs by default time can fail to capture important logs. For example, a default time frame of 2 minutes will fail to capture the last logs of Session ID 3 as shown below.

| Action | Resource | Time | Session ID |
|---|---|---|---|
| ListDB | Resource-1 | Jun. 23, 2022 10:55:16 | 1 |
| ListDB | Resource-1 | Jun. 23, 2022 10:55:32 | 1 |
| CopyDBTable | Resource-2 | Jun. 23, 2022 10:56:16 | 1 |
| DeleteTable | Resource-2 | Jun. 23, 2022 10:56:56 | 1 |
| ListDB | Resource-1 | Jun. 23, 2022 11:25:00 | 2 |
| CopyDBTable | Resource-2 | Jun. 23, 2022 11:25:31 | 2 |
| DeleteTable | Resource-2 | Jun. 23, 2022 11:26:11 | 2 |
| ListDB | Resource-1 | Jun. 23, 2022 11:27:04 | 3 |
| ListDB | Resource-1 | Jun. 23, 2022 11:27:04 | 3 |
| ListDB | Resource-1 | Jun. 23, 2022 11:27:20 | 3 |
| ListDB | Resource-1 | Jun. 23, 2022 11:27:36 | 3 |
| ListDB | Resource-1 | Jun. 23, 2022 11:27:52 | 3 |
| ListDB | Resource-1 | Jun. 23, 2022 11:28:06 | 3 |
| CopyDBTable | Resource-2 | Jun. 23, 2022 11:29:20 | 4 |
| DeleteTable | Resource-2 | Jun. 23, 2022 11:30:01 | 4 |

As another example, grouping documented logs by number of logs also fails to accurately group applicative sessions. An example shows grouping documented logs by setting the number of logs per session to 4 shown below. This method fails to capture the second and third applicative sessions.

| Action | Resource | Time | Session ID |
|---|---|---|---|
| ListDB | Resource-1 | Jun. 23, 2022 10:55:16 | 1 |
| ListDB | Resource-1 | Jun. 23, 2022 10:55:32 | 1 |
| CopyDBTable | Resource-2 | Jun. 23, 2022 10:56:16 | 1 |
| DeleteTable | Resource-2 | Jun. 23, 2022 10:56:56 | 1 |
| ListDB | Resource-1 | Jun. 23, 2022 11:25:00 | 2 |
| CopyDBTable | Resource-2 | Jun. 23, 2022 11:25:31 | 2 |
| DeleteTable | Resource-2 | Jun. 23, 2022 11:26:11 | 2 |
| ListDB | Resource-1 | Jun. 23, 2022 11:27:04 | 2 |
| ListDB | Resource-1 | Jun. 23, 2022 11:27:04 | 3 |
| ListDB | Resource-1 | Jun. 23, 2022 11:27:20 | 3 |
| ListDB | Resource-1 | Jun. 23, 2022 11:27:36 | 3 |
| ListDB | Resource-1 | Jun. 23, 2022 11:27:52 | 3 |
| ListDB | Resource-1 | Jun. 23, 2022 11:28:06 | 4 |
| CopyDBTable | Resource-2 | Jun. 23, 2022 11:29:20 | 4 |
| DeleteTable | Resource-2 | Jun. 23, 2022 11:30:01 | 4 |

The approach for the present systems and methods for session grouping is to separate sessions by their probability of starting a new applicative session. As defined herein, a session is a group of actions (activities) or a sequence of repeating actions performed by a machine. To achieve this, signals can be transformed from analog to digital. This is done by resampling logs by a given time frame, the given time frame being any predetermined time frame. The resampling can be done based on machine activity, where each machine is resampled based on how often there is activity. For example, each machine is resampled by 1 second for machines that have at least 1 activity per second for at least 80% of the seconds in the past 30 days, 30 seconds for machines that have at least 1 activity per 30 seconds for at least 80% of the seconds in the past 30 days, and 1 minute for all other machines. It will be appreciated that other time intervals may be used, and the examples disclosed herein shall be contemplated as non-limiting. The transformed data may look as follows, where the time, and number of activities occurred in that time are represented.

| Time | Number of Activities |
|---|---|
| 2022-02-05T23:00:00.0000 | 4 |
| 2022-02-06T00:00:00.0000 | 0 |
| 2022-02-06T01:00:00.0000 | 0 |
| 2022-02-06T02:00:00.0000 | 0 |
| 2022-02-06T03:00:00.0000 | 0 |
| 2022-02-06T04:00:00.0000 | 0 |
| 2022-02-06T05:00:00.0000 | 0 |
| 2022-02-06T06:00:00.0000 | 0 |
| 2022-02-06T07:00:00.0000 | 0 |
| 2022-02-06T08:00:00.0000 | 0 |
| 2022-02-06T09:00:00.0000 | 8 |
| 2022-02-06T10:00:00.0000 | 0 |

-continued

| Time | Number of Activities |
|---|---|
| 2022-02-06T11:00:00.0000 | 0 |
| 2022-02-06T12:00:00.0000 | 0 |
| 2022-02-06T13:00:00.0000 | 0 |
| 2022-02-06T14:00:00.0000 | 0 |
| 2022-02-06T15:00:00.0000 | 0 |
| 2022-02-06T16:00:00.0000 | 0 |
| 2022-02-06T17:00:00.0000 | 0 |
| 2022-02-06T18:00:00.0000 | 18 |
| 2022-02-06T19:00:00.0000 | 0 |
| 2022-02-06T20:00:00.0000 | 0 |
| 2022-02-06T21:00:00.0000 | 0 |
| 2022-02-06T22:00:00.0000 | 0 |
| 2022-02-06T23:00:00.0000 | 7 |
| 2022-02-07T00:00:00.0000 | 0 |
| 2022-02-07T01:00:00.0000 | 0 |
| 2022-02-07T02:00:00.0000 | 0 |
| 2022-02-07T03:00:00.0000 | 0 |
| 2022-02-07T04:00:00.0000 | 0 |
| 2022-02-07T05:00:00.0000 | 0 |

The time between active timeframes is then calculated, an example for a part of which is represented in the table below.

| Activity Group | Time (seconds) |
|---|---|
| 1 | 36000.0000 |
| 2 | 32400.0000 |
| 3 | 18000.0000 |
| 4 | 36000.0000 |
| 5 | 32400.0000 |
| 6 | 18000.0000 |
| 7 | 36000.0000 |
| 8 | 32400.0000 |
| 9 | 18000.0000 |
| 10 | 36000.0000 |
| 11 | 32400.0000 |
| 12 | 18000.0000 |
| 13 | 36000.0000 |
| 14 | 50400.0000 |

The process then includes grouping together observations with similar time breaks until the next active timeframe. In this example, ordered ascendingly from the smallest break to the largest.

| Time Difference | Observations |
|---|---|
| 18000.0000 | 55 |
| 32400.0000 | 53 |
| 36000.0000 | 53 |
| 50400.0000 | 2 |
| 54000.0000 | 2 |
| 68400.0000 | 5 |

A cumulative aggregation of the observation for every time difference, divided by the total observation amount (represented in the cumulative sum probability column) gives the probability of a new log to arrive after a given time interval.

| Time Difference | Observations | Cumulative Sum | Cumulative Sum Probability |
|---|---|---|---|
| 18000.0000 | 55 | 55 | 0.32353 |
| 32400.0000 | 53 | 108 | 0.63529 |
| 36000.0000 | 53 | 161 | 0.94706 |
| 50400.0000 | 2 | 163 | 0.95882 |
| 54000.0000 | 2 | 165 | 0.97059 |
| 68400.0000 | 5 | 170 | 1.00000 |

FIG. 5 shows an illustrative plot of the cumulative sum probability of the present example. A near-zero slope (e.g. in the values of 35000-50000), means that if a machine rested for 35,000 seconds already, it is most likely to rest at least 50,000 seconds. Such breaks are considered as potential candidates for an applicative session separation.

Figure 6:
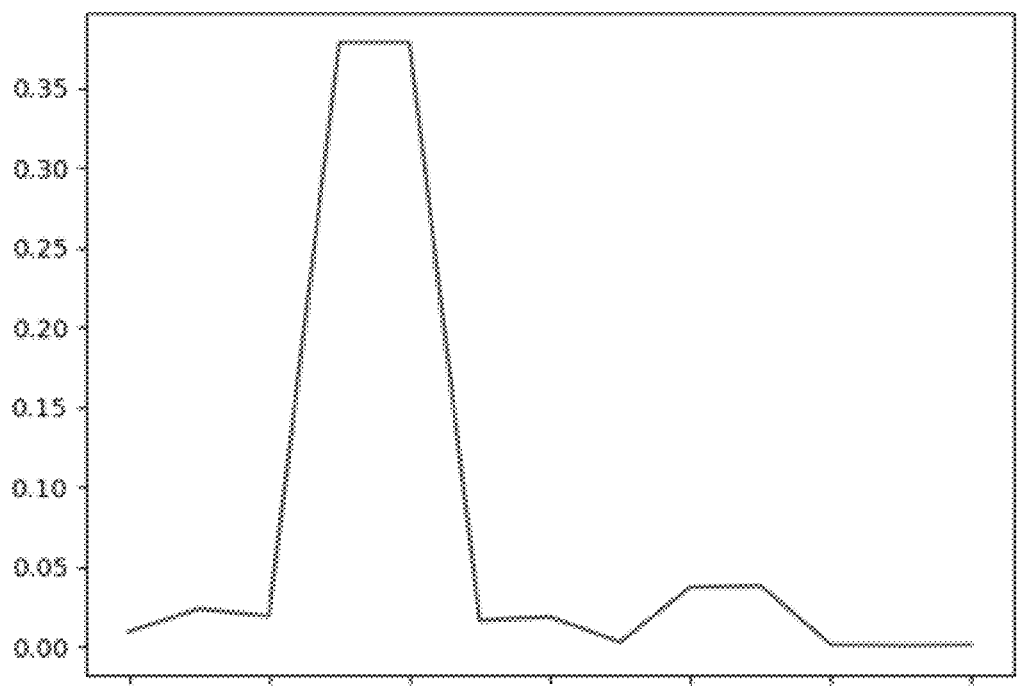
FIG. 6 is an illustrative graph of a local maximum of a gradient change.

The process then then defines the optimal session separation as the smallest time difference that meets the two conditions of being larger than the mean time difference and an inflection point (local maximum) of a gradient change.

a. time difference > mean (all time differences)

b. $\left( \frac{d}{d(\text{time difference})} \text{cumulative sum prob}_i - \frac{d}{d(\text{time difference})} \text{cumulative sum prob}_{i-1} \right) > 0$ In the example, the first time difference that meets these conditions is at 36,000 that is both larger than the mean time difference (30,388) and is an inflection point (gradient change>0), and therefore a break required to generate a new applicative session is define. This is shown in FIG. 6.

| Time Difference | Observations | Cumulative Sum | Cumulative Sum Probability | Gradient | Gradient Change | Larger than the mean |
|---|---|---|---|---|---|---|
| 18000 | 55 | 55 | 0.32353 | 0.0000180 | N/A | No |
| 32400 | 53 | 108 | 0.63529 | 0.0000217 | 0.0000037 | No |
| 36000 | 53 | 161 | 0.94706 | 0.0000866 | 0.0000650 | Yes |
| 50400 | 2 | 163 | 0.95882 | 0.0000008 | −0.000085 | Yes |
| 54000 | 2 | 165 | 0.97059 | 0.0000033 | 0.0000025 | Yes |
| 68400 | 5 | 170 | 1.00000 | 0.0000020 | −0.000001 | Yes |

Having the session break value, the present system can go back to the log data, and define a new applicative session each time the machine rests, if the time passed before the next log is larger than the first local maximum. For example, in machine M1, the applicative session break will look as follows:

| Action | Resource | Time | Session ID |
|---|---|---|---|
| ListDB | Resource-1 | Jun. 23, 2022 10:55:16 | 1 |
| ListDB | Resource-1 | Jun. 23, 2022 10:55:32 | 1 |
| CopyDBTable | Resource-2 | Jun. 23, 2022 10:56:16 | 1 |
| DeleteTable | Resource-2 | Jun. 23, 2022 10:56:56 | 1 |
| ListDB | Resource-1 | Jun. 23, 2022 11:25:00 | 2 |
| CopyDBTable | Resource-2 | Jun. 23, 2022 11:25:31 | 2 |
| DeleteTable | Resource-2 | Jun. 23, 2022 11:26:11 | 2 |
| ListDB | Resource-1 | Jun. 23, 2022 11:27:04 | 3 |
| ListDB | Resource-1 | Jun. 23, 2022 11:27:04 | 3 |
| ListDB | Resource-1 | Jun. 23, 2022 11:27:20 | 3 |
| ListDB | Resource-1 | Jun. 23, 2022 11:27:36 | 3 |
| ListDB | Resource-1 | Jun. 23, 2022 11:27:52 | 3 |
| ListDB | Resource-1 | Jun. 23, 2022 11:28:06 | 3 |
| CopyDBTable | Resource-2 | Jun. 23, 2022 11:29:20 | 3 |
| DeleteTable | Resource-2 | Jun. 23, 2022 11:30:01 | 3 |

It will be appreciated that the present systems and methods may be applied to any number of machines operating in a cloud-based system, in addition to virtual machines, and the example of a single machine (M1) shall be contemplated as a non-limiting example.

After the initial applicative session separation, the present system will add a second layer of internal session separation by the following steps. For each action and resource combination, the system will calculate the probability of the log to be a closing activity.

| | | Total Occurrences | Closing Occurrences | Chance for a Closing Session |
|---|---|---|---|---|
| ListDB | Resource-1 | 5000 | 4 | 0.08% |
| CopyDBTable | Resource-2 | 2700 | 35 | 1.30% |
| DeleteTable | Resource-2 | 1000 | 940 | 94.00% |

If a combination of an action and a resource has more than a 90% probability of being a closing session, the system will adjust and define all of these logs to be closing sessions. It will be appreciated that the present threshold can be calculated dynamically, and the 90% threshold of the present example shall be contemplated as non-limiting.

Similarly, for each action and resource combination, the system will calculate the probability of the log to be an opening activity.

| | | Total Occurrences | Opening Occurrences | Chance for an Opening Session |
|---|---|---|---|---|
| ListDB | Resource-1 | 5000 | 4550 | 91.00% |
| CopyDBTable | Resource-2 | 2700 | 70 | 2.59% |
| DeleteTable | Resource-2 | 1000 | 0 | 0.00% |

If a combination of an action and a resource has more than a 90% probability of being an opening session, the system will adjust and define all of these logs to be opening sessions. Again, It will be appreciated that the present threshold can be calculated dynamically, and the 90% threshold of the present example shall be contemplated as non-limiting.

Figure 7:
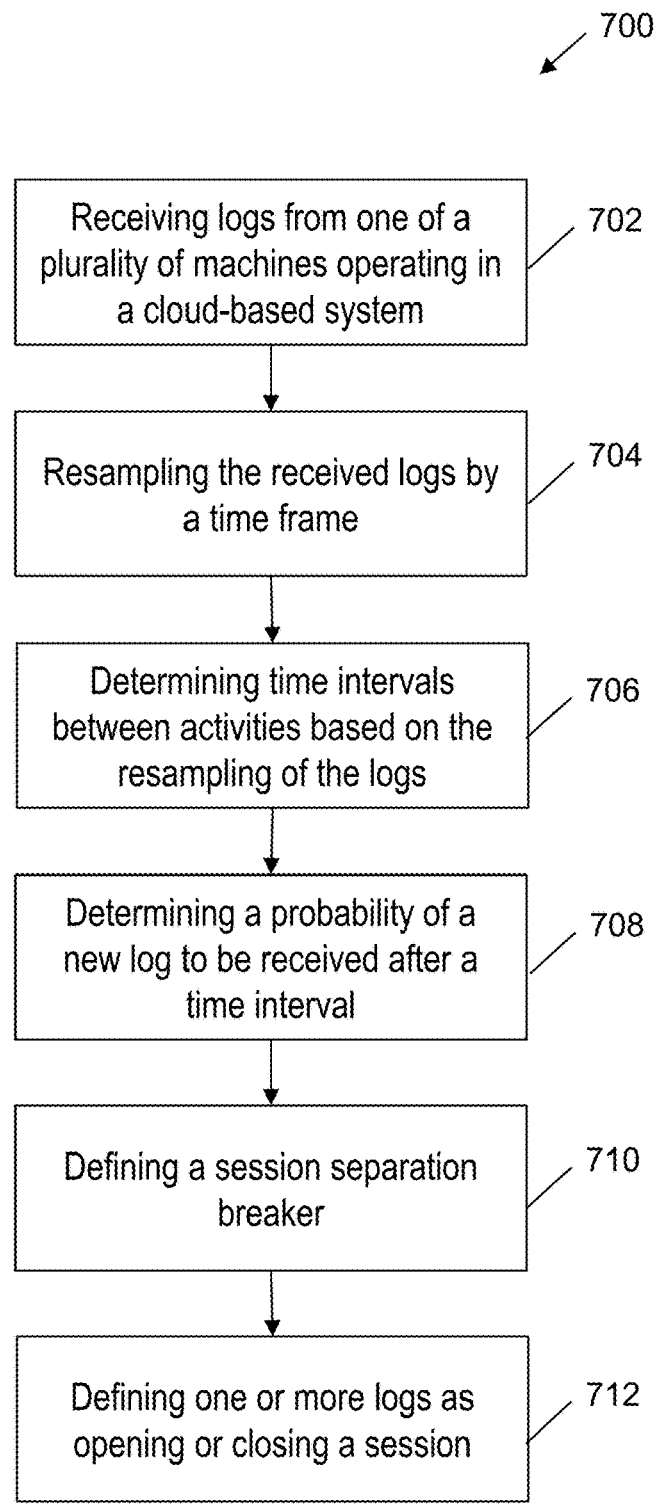
FIG. 7 is a flow chart of an embodiment of the dynamic applicative session grouping process disclosed herein.

FIG. 7 is a flow chart of an embodiment of the dynamic applicative session grouping process disclosed herein. The system receives logs (step 702) from one of a plurality of machines. It will be appreciated that the system can receive and manage logs from any number of machines in the cloud-based system. The system then resamples (step 704) the received logs by a given time frame. The system then determines time intervals (step 706) between activities based on the resampling of the logs. After determining the time intervals, the system determines a probability (step 708) of a new log to be received after a time interval. The system then defines a session separation breaker (step 710) and defines one or more logs as opening or closing a session (step 712).

In various embodiments, the resampling can be done based on machine activity, where each machine is resampled based on how often there is activity. The probability determined for a new log to be received can be a cumulative sum probability based on observed activity and time intervals. In some embodiments, breaks in machine activity are monitored, wherein such breaks are considered as candidates for an applicative session separation. The system can additionally defining a local maximum of a gradient change as a session separation breaker. The present system can go back to the log data, and define a new applicative session each time the machine rests, if the time passed before the next log is larger than a first local maximum. The processes described in this disclosure, performed by the system, may be applied to any number of machines operating in a cloud-based system. A threshold to define a log as opening or closing a session can be calculated dynamically. A machine learning model can be built and trained as described herein to perform the session grouping and log identification described in the present disclosure.

Machine Learning in Network Security

In various embodiments, a machine learning model is trained by utilizing historical logs and current logs to perform the defining of opening and closing logs. In such embodiments, the system will determine an opening or closing of a session by way of the machine learning model.

Machine learning can be used in various applications, including malware detection, intrusion detection, threat classification, the user or content risk, detecting malicious clients or bots, detecting suspicious behavior, etc. In a particular use case in the present disclosure, machine learning can be used to determine logs as opening and closing a session. That is, a machine learning model is built and trained as described herein to perform the session grouping and log identification described in the present disclosure.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause a processor to:
   perform inline monitoring of a cloud-based system, wherein the inline monitoring includes generating logs associated with actions performed by a plurality of machines operating in the cloud-based system, wherein the plurality of machines include any of devices, servers, and virtual machines operating through the cloud-based system;
   resample the logs by a time frame based on a machine activity and how often there is activity;
   computing probabilities of a new action to be performed after a time interval for each machine of the plurality of machines, the time interval is defined by the resampling;
   define one or more session separation breaks for each machine of the plurality of machines based on the probabilities, wherein a session separation break defines a separation between sessions of the plurality of machines; and
   define one or more logs as opening or closing a session, thereby defining, for each of the plurality of machines, a plurality of applicative sessions for detecting suspicious behavior in the cloud-based system.

2. The non-transitory computer-readable medium of claim 1, wherein the resampling comprises resampling logs of each machine of the plurality of machines based on the activity of each machine, where the logs of a specific machine are resampled based on how often activity is monitored for the specific machine.

3. The non-transitory computer-readable medium of claim 1, wherein computing probabilities includes computing, for each time interval, a cumulative sum probability for a new log to be received after each time interval based on observed activity and time interval, wherein the cumulative sum probability is configured to identify a trend in log reception.

4. The non-transitory computer-readable medium of claim 1, wherein breaks in machine activity are monitored, and wherein the monitored breaks are considered as candidates for an applicative session separation.

5. The non-transitory computer-readable medium of claim 1, wherein a local maximum of a gradient change is defined as a session separation breaker.

6. The non-transitory computer-readable medium of claim 1, wherein a new applicative session is defined each time the machine rests, if the time passed before the next log is larger than a first local maximum.

7. The non-transitory computer-readable medium of claim 1, wherein a log is defined via a machine learning model as opening or closing a session based on a probability threshold, and wherein the threshold is calculated dynamically.

8. The non-transitory computer-readable medium of claim 1, wherein a machine learning model is trained to detect session separations with historic machine activity logs, the historic machine activity logs including actions and times associated therewith for each of the plurality of machines, and wherein the instructions further cause the processor to:
   generate, via the inline monitoring, activity logs associated with the plurality of machines operating in the cloud-based system; and
   define, via the trained machine learning model, one or more of the activity logs as opening or closing a session.

9. A method of providing dynamic session separation for detecting suspicious behavior in a cloud-based system, the method comprising steps of:
   performing inline monitoring of the cloud-based system, wherein the inline monitoring includes generating logs associated with actions performed by a plurality of machines operating in the cloud-based system, wherein the plurality of machines include any of devices, servers, and virtual machines operating through the cloud-based system;
   resampling the logs by a time frame based on a machine activity and how often there is activity;
   computing probabilities of a new action to be performed after a time interval for each machine of the plurality of machines, the time interval is defined by the resampling;
   defining one or more session separation breaks for each machine of the plurality of machines based on the probabilities, wherein a session separation break defines a separation between sessions of the plurality of machines; and
   defining one or more logs as opening or closing a session, thereby defining, for each of the plurality of machines, a plurality of applicative sessions for detecting suspicious behavior in the cloud-based system.

10. The method of claim 9, wherein the resampling comprises resampling logs of each machine of the plurality of machines based on the activity of each machine, where the logs of a specific machine are resampled based on how often activity is monitored for the specific machine.

11. The method of claim 9, wherein computing probabilities includes computing, for each of the time interval, a cumulative sum probability for a new log to be received after each of the time interval based on observed activity.

12. The method of claim 9, wherein breaks in machine activity are monitored, and wherein the monitored breaks are considered as candidates for an applicative session separation.

13. The method of claim 9, wherein a local maximum of a gradient change is defined as a session separation breaker.

14. The method of claim 9, wherein a new applicative session is defined each time the machine rests, if the time passed before the next log is larger than a first local maximum.

15. The method of claim 9, wherein a log is defined as opening or closing a session based on a probability threshold, and wherein the threshold is calculated dynamically.

16. The method of claim 9, wherein a machine learning model is trained to detect session separations with historic machine activity logs, the historic machine activity logs including actions and times associated therewith for each of the plurality of machines, and wherein the steps further comprise:
   generating, via the inline monitoring, activity logs associated with the plurality of machines operating in the cloud-based system; and
   defining, via the trained machine learning model, one or more of the activity logs as opening or closing a session.

17. A cloud-based system for providing dynamic session separation comprising:
   one or more processors; and
   memory storing instructions that, when executed, cause the one or more processors to:
      perform inline monitoring of the cloud-based system, wherein the inline monitoring includes generating logs associated with actions performed by a plurality of machines operating in the cloud-based system, wherein the plurality of machines include any of devices, servers, and virtual machines operating through the cloud-based system;
      resample the logs by a time frame based on a machine activity and how often there is activity;
      compute probabilities of a new action to be performed after a time interval for each machine of the plurality of machines, the time interval is defined by the resampling;
      define one or more session separation breaks for each machine of the plurality of machines based on the probabilities, wherein a session separation break defines a separation between sessions of the plurality of machines; and
      define one or more logs as opening or closing a session, thereby defining, for each of the plurality of machines, a plurality of applicative sessions for detecting suspicious behavior in the cloud-based system.

18. The cloud-based system of claim 17, wherein the resampling comprises resampling logs of each machine of the plurality of machines based on the activity of each machine, where the logs of a specific machine are resampled based on how often activity is monitored for the specific machine.

19. The cloud-based system of claim 17, wherein a log is defined as opening or closing a session based on a probability threshold, and wherein the threshold is calculated dynamically.

20. The cloud-based system of claim 17, wherein a machine learning model is trained to detect session separations with historic machine activity logs, the historic machine activity logs including actions and times associated therewith for each of the plurality of machines, and wherein the instructions further cause the one or more processors to:
   generate, via the inline monitoring, activity logs associated with the plurality of machines operating in the cloud-based system; and
   define, via the trained machine learning model, one or more of the activity logs as opening or closing a session.

* * * * *